April 15, 1941.　　　　A. FISCHER　　　　2,238,257
SAFETY PLUG
Filed July 27, 1939　　　　2 Sheets-Sheet 1
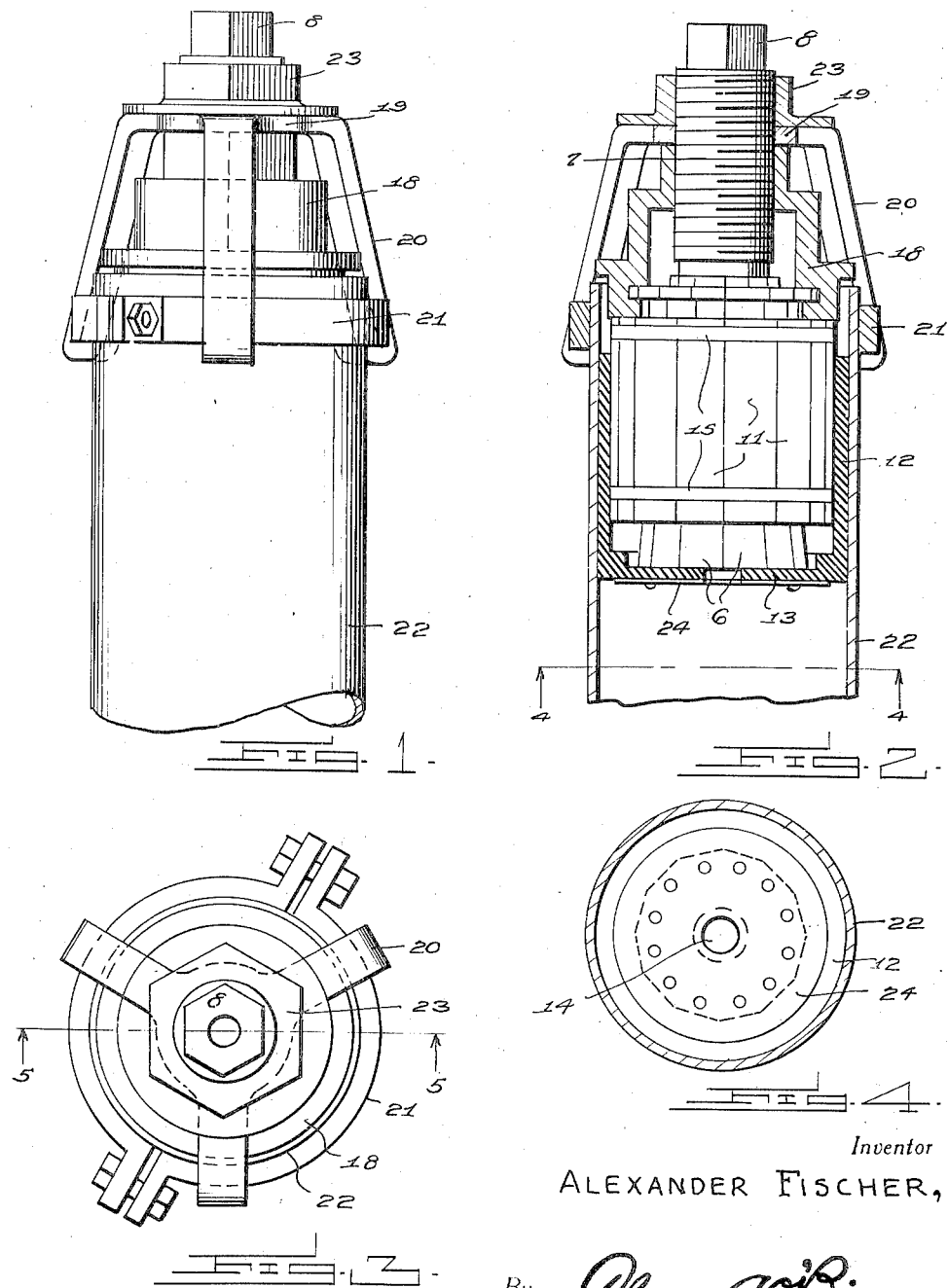
Inventor
ALEXANDER FISCHER,
By Clarence A. O'Brien
and Hyman Berman
Attorneys April 15, 1941.　　　　A. FISCHER　　　　2,238,257
SAFETY PLUG
Filed July 27, 1939　　　　2 Sheets-Sheet 2
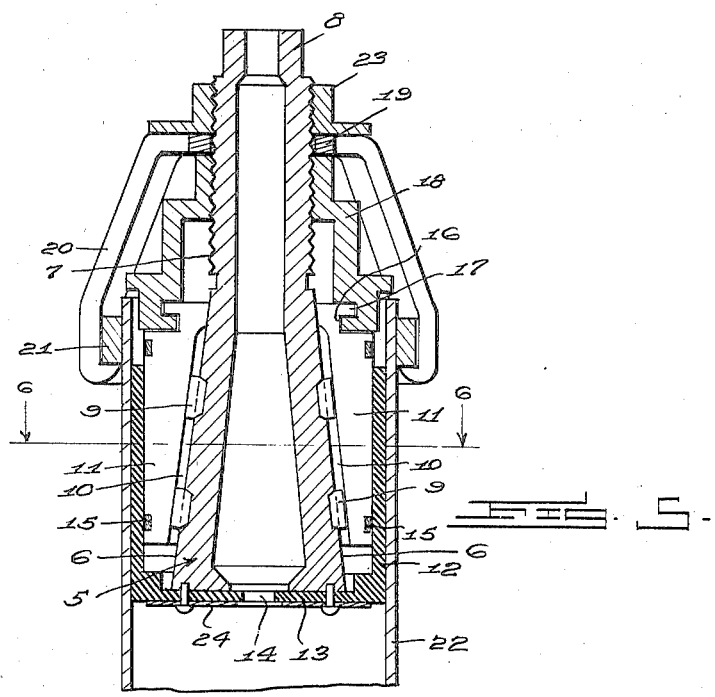
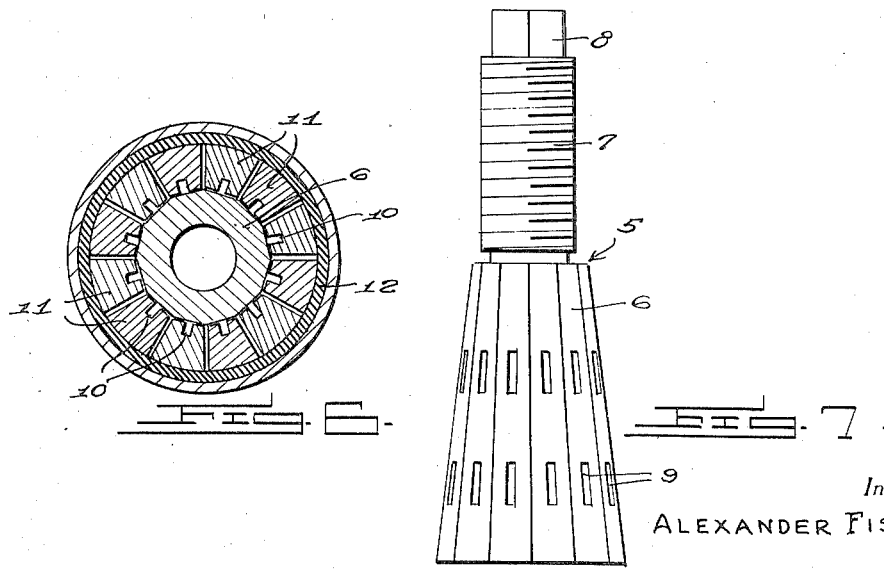
Inventor
ALEXANDER FISCHER,
By Clarence A. O'Brien
and Hyman Berman
Attorneys Patented Apr. 15, 1941

2,238,257

UNITED STATES PATENT OFFICE 2,238,257

SAFETY PLUG

Alexander Fischer, Los Angeles, Calif.

Application July 27, 1939, Serial No. 286,910

2 Claims. (Cl. 220—24.5)

This invention relates to safety plugs for high pressure pipes, and has for the primary object the provision of a device of this character which may be easily and quickly adjusted to pipes of varying diameters and when adapted to a pipe will provide a positive closure thereto and will be capable of withstanding a maximum amount of pressure without danger of leakage.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a safety plug constructed in accordance with my invention and showing the same adapted to a pipe.

Figure 2 is a vertical sectional view illustrating the same.

Figure 3 is a top plan view illustrating the device.

Figure 4 is a sectional view taken on the line 4—4 of Figure 2.

Figure 5 is a sectional view taken on the line 5—5 of Figure 3.

Figure 6 is a sectional view taken on the line 6—6 of Figure 5.

Figure 7 is a side elevation illustrating the core or expander.

Referring in detail to the drawings, the numeral 5 indicates a core or expander including a substantially conical shaped body 6 and a screw threaded shank 7 integral therewith and terminating in a wrench engaging portion 8. The body 6 has angularly related faces on which are formed or secured keys 9 to be received in grooves 10 of expanding elements 11 coacting with each other to form on the body 6 of the expander 5 a sleeve-like portion to extend into a sleeve-type gasket 12, one end of which has an end wall 13 secured on the butt end of the body 6 of the expander for attaching the sleeve-like gasket to the expander with the major portion of the expanding elements 11 covered thereby. The inner faces of the expanding elements are curved to match the faces of the body of the expander and are further tapered toward the butt end of the body of the expander. The expanding elements are retained in assembled position on the expander by contractible bands or rings 15 fitting in external grooves of said expanding elements. The expanding elements are further provided with notches which coact in forming an annular groove 16 and an annular flange 17.

A stepped cap 18 is threaded on the shank 7 and is provided with an annular groove and an annular flange having interlocking connection with the annular groove and flange of the expanding element for rotatably connecting the latter to the stepped cap. The stepped cap provides a connection between the expanding element and the screw threaded stem of the expander.

An apertured disc 19 receives the stem and rests upon the cap and is provided with outwardly and downwardly extending jaws 20 to engage with a clamping ring 21 of sectional formation and which is adapted to be clamped about a pipe 22 when the device is adapted to said pipe.

A retaining nut 23 is threaded on the stem and engages with the disc 19 to force the latter against the cap.

The closed wall 13 of the sleeve-like gasket 12 is secured on the butt end of the expander 5 by a retaining plate 24 riveted to the expander with the rivets passing through the end wall of the gasket.

Rotation of the expander in opposite directions will bring about expansion and contraction of the expanding elements and consequently the expansion and contraction of the gasket which will permit the device to be readily inserted into a pipe and then tightly engaged therewith and with the jaws applied to the clamping ring the device will be prevented from being forced out of the pipe by excessive pressure.

It is believed that the foregoing description when taken in connection with the drawings will fully set forth the construction and advantages of this invention to those skilled in the art to which such device relates, so that further detailed description will not be required.

Having thus described the invention, what I claim is:

1. A safety plug comprising an expander including a substantially conical-shaped body and a screw threaded stem, expanding elements keyed on said body and coacting with each other to form a cylindrical portion, a sleeve-type gasket receiving the expanding elements and having a flanged end secured on the body, a cap rotatably connected to the expanding elements and threaded on the stem.

2. A safety plug comprising an expander including a substantially conical-shaped body and a screw threaded stem, expanding elements keyed on said body and coacting with each other to form a cylindrical portion, a sleeve-type gasket receiving the expanding elements and having a flanged end secured on the body, a cap rotatably connected to the expanding elements and threaded on the stem, an apertured plate receiving said stem, jaws formed on said plate to engage a clamping ring adapted to a pipe, and a nut threaded on the stem against said plate for forcing the latter against the cap.

ALEXANDER FISCHER.